United States Patent
Anderson et al.

(10) Patent No.: US 10,006,242 B2
(45) Date of Patent: Jun. 26, 2018

(54) SELF-CLOSING INTERIOR DOOR ACCESS PANEL

(71) Applicant: Duran Anderson, Washington, UT (US)

(72) Inventors: Duran Anderson, Washington, UT (US); Wayne A. Provost, St. George, UT (US)

(73) Assignee: Bug Stop LLC, Washington, UT (US)

( * ) Notice: Subject to any disclaimer, the term of this patent is extended or adjusted under 35 U.S.C. 154(b) by 0 days. days.

(21) Appl. No.: 15/332,401

(22) Filed: Oct. 24, 2016

(65) Prior Publication Data

US 2018/0100349 A1 Apr. 12, 2018

Related U.S. Application Data

(60) Provisional application No. 62/407,209, filed on Oct. 12, 2016.

(51) Int. Cl.
*E05D 15/48* (2006.01)
*E06B 7/32* (2006.01)
(Continued)

(52) U.S. Cl.
CPC ............... *E06B 7/32* (2013.01); *B60J 5/0486* (2013.01); *E05D 15/0621* (2013.01);
(Continued)

(58) Field of Classification Search
CPC .......... E06B 7/32; E06B 5/00; E06B 15/0621; B60J 5/0486; E05D 15/165; E05F 1/00; E05F 1/16
(Continued)

(56) References Cited

U.S. PATENT DOCUMENTS 1,025,721 A * 5/1912 Raney ........................ E06B 9/52
160/180
2,573,160 A * 10/1951 Norman ................... A62C 2/18
16/80
(Continued)

OTHER PUBLICATIONS

"RVPlus Search Catalog," Accessed Jul. 14, 2016 Available at http://www.rvpl us.conVindex.php?dispatch=product_features. view_all&q=indeKphp%3Fdispatch%3DprodLicts. search%26filterJd%3D4%26 14 pages.
(Continued)

*Primary Examiner* — Jerry E Redman
(74) *Attorney, Agent, or Firm* — Workman Nydegger (57) ABSTRACT

A two door system for recreational vehicles or camper style trailers is disclosed including an interior door with a self-closing access panel for reaching a locking mechanism of an exterior door. The access panel provides a user the ability to reach and manipulate the latching mechanism of the exterior door from the interior of the vehicle even when the interior door is closed. A biasing member is disclosed that maintains the access panel in a closed position whenever an adequate opening force is not present. The access panel may take on a number of configurations and may be designed as a retrofit for existing door systems or as an original component. In a configuration, a vertically sliding movable panel portion may be provided, which defaults to a downward, closed position. In such embodiments, no biasing member may be needed (gravity may be sufficient for the movable panel portion to close).

18 Claims, 8 Drawing Sheets (51) Int. Cl.
   *E05F 1/16*    (2006.01)
   *E05F 1/00*    (2006.01)
   *E06B 5/00*    (2006.01)
   *E05D 15/06*   (2006.01)
   *E05D 15/16*   (2006.01)
   *B60J 5/04*    (2006.01)
   *B60P 3/32*    (2006.01)

(52) U.S. Cl.
   CPC .............. *E05D 15/165* (2013.01); *E05F 1/00* (2013.01); *E05F 1/16* (2013.01); *E06B 5/00* (2013.01); *B60P 3/32* (2013.01); *E05Y 2900/512* (2013.01)

(58) Field of Classification Search
   USPC ............... 49/61, 63, 67, 169, 170, 171, 404; 160/180, 89, 92, 96
   See application file for complete search history.

(56) References Cited

U.S. PATENT DOCUMENTS

| | | | | |
|---|---|---|---|---|
| 2,779,401 A * | 1/1957 | Bascom | ............... | E06B 3/44 16/443 |
| 3,024,837 A * | 3/1962 | McPhail | ............... | E06B 5/003 160/91 |
| 4,094,099 A * | 6/1978 | Birch | ............... | B60J 1/2011 160/96 |
| 4,757,642 A * | 7/1988 | Hahn | ............... | E05F 1/16 16/77 |
| 5,313,739 A * | 5/1994 | Nelson | ............... | E05F 1/16 16/72 |
| 5,513,469 A * | 5/1996 | Tajudeen | ............... | E05F 1/16 49/404 |
| 5,720,080 A * | 2/1998 | Rose | ............... | E05F 1/16 16/74 |
| 6,009,932 A * | 1/2000 | Smith | ............... | E05B 7/00 160/180 |
| 6,449,902 B1 * | 9/2002 | Tumin | ............... | E05B 65/0864 49/354 |
| 6,691,465 B1 * | 2/2004 | Stephan | ............... | E05F 1/16 16/72 |
| 7,124,469 B2 * | 10/2006 | Tsekhanovsky | ............... | E05F 1/16 16/79 |
| 8,794,683 B2 * | 8/2014 | Wysong | ............... | E05B 83/44 292/1 |
| 8,960,733 B1 * | 2/2015 | Smith | ............... | E05C 7/02 292/126 |
| 2003/0070768 A1 * | 4/2003 | Lewis, Jr. | ............... | E05D 3/04 160/92 |
| 2006/0202506 A1 * | 9/2006 | Brabeck | ............... | B60P 3/36 296/146.1 |
| 2007/0138810 A1 * | 6/2007 | Armbrustmacher | .. | E05B 1/0053 292/336.3 |
| 2007/0221340 A1 * | 9/2007 | Aaron | ............... | B60J 5/0487 160/89 |
| 2007/0251519 A1 * | 11/2007 | Anikhindi | ............... | E05D 15/20 126/194 |

OTHER PUBLICATIONS

Screen Door Accessories "Recreational Vehicle Accessories," Accessed Jul. 14, 2016, Available at http://rvadenver.conVscreen_door_accessories.htm 10 pages.
National Statistics "RV Ownership," Accessed Jul. 28, 2016, Available at http://www.prvca.org/NationalStatIstics/tabicl/194/language/en-US/Default.aspx 2 pages.
"Facts on Camping and Recreational Vehicles," Accessed Jul. 28, 2016, Available at http://www.statista.com/topics/1319/camping-and-recreational-vehicles/ 2 pages.
Wikipedia "List of recreational vehicle manufacturers," Accessed Jul. 28, 2016, Available at https://en.wiMpedia.org/wiki/List_of_recreational_\ehicle_manufacturers 3 pages.

* cited by examiner

SELF-CLOSING INTERIOR DOOR ACCESS PANEL

CROSS-REFERENCE TO RELATED APPLICATIONS

The present application claims the benefit under 35 USC § 119(e) of U.S. Patent Application Ser. No. 62/407,209, filed Oct. 12, 2016 and entitled "SELF-CLOSING INTERIOR DOOR ACCESS PANEL", which is herein incorporated by reference in its entirety.

BACKGROUND OF THE INVENTION

1. The Field of the Invention

The present invention generally relates to a system for including within an interior door of a two door system a self-closing access panel that allows a user to reach the door handle and latching mechanism of an exterior door. The embodiments described herein discuss a number of configurations for the access panel assembly as well as a number of biasing member configurations to provide the self-closing aspects of the access panel.

2. The Relevant Technology

Presently, two door systems are commonly used on recreational vehicles (RVs) and camper style trailers, fifth wheels, and the like. Such systems include an exterior door and an interior door arranged such that they open and close along substantially the same path. The exterior door is typically designed to match the exterior of the vehicle as a whole and is composed of similar materials as the exterior body. The exterior door is often designed to provide both protection from the elements as well as a degree of security from unauthorized entry.

The second door in the system is typically a screen door type interior door. By having a screen door, a user of the vehicle can better control the interior environment. Other times, the interior door may be formed of transparent or translucent glass or plastic-type panels that may allow in light but not air. For example, upon arrival at a camp site, the user may lock the exterior door into a fully opened position while leaving an interior screen door closed, allowing greater airflow and a sense of the outdoors to be felt from within the interior of the vehicle, but while preventing mosquitos, other bugs, and the like from entering.

A common problem with such two door systems is that a user on the interior of the vehicle needs some way to access the latch or handle mechanism of the exterior door in order to exit. One solution would be to first open the interior door and then open the exterior door, although this can be problematic, as typically the exterior door first needs to be moved out of the pathway of the interior door. Another option is to provide a cutout within the interior door in proximity to the exterior door latching mechanism such that the user may reach through the interior door at the access panel to open the exterior door. The interior door is then able to open. In some configurations, the interior and exterior doors may swing open together, as a single unit (e.g., the interior door could be selectively coupled to the exterior door so that both swing together).

In some configurations, an access panel door or cover is incorporated within the interior door. A user slides the access door open and reaches through the now open access area to reach the exterior door latch. Such an access panel configuration has become the primary solution in most current two-door RV systems. However, this solution presents several drawbacks.

BRIEF SUMMARY OF THE INVENTION

To overcome difficulties with existing technologies, a two-door system described herein is configured such that a self-closing access panel is integrated within an interior door and includes a biasing member that maintains the access panel in a closed position until, and only while, an adequate opening force is applied in opposition to the biasing member.

In some embodiments, the biasing member provides a pushing force to close the access panel while in other embodiments, the biasing member provides a pulling closing force. Further, in some embodiments the self-closing access panel assembly may be provided in a manner to allow retrofitting into an existing two-door system. In other embodiments the assembly may be integrated within an interior door of a two-door system during initial manufacture.

Such embodiments address a principal disadvantage of existing two-door systems with a sliding access panel, which while beneficial in that they provide access to the latch mechanism of the exterior door, they also typically remain open once opened, so that if the exterior door is also open, mosquitos, bugs, rain, and even birds have been known to enter the vehicle interior through this small opening. Such access panel covers have also been known to bounce between open and closed positions (covering the latch mechanism on the exterior door) as the RV travels down the road (particularly a bumpy road). Where the interior door may be something other than a screen door, designed to allow in light but not air flow, the open access panel also interferes with the ability to efficiently control climate within the cabin of the RV.

In an embodiment, the present invention is directed to an inner door (e.g., of a two-door system) where a self-closing access panel is provided on the inner door. The inner door of such a system may include a hinge edge and an access panel assembly. The hinge edge may be configured so that the inner door is capable of moving independently, but in a substantially similar path to an outer door, wherein the inner door is located interior to a vehicle relative to the outer door, and wherein the access panel assembly selectively provides access for a user to open, lock, or unlock a latching mechanism of the outer door through a movable panel portion of the inner door, without having to open the entire inner door. The access panel assembly of the inner door may include a frame having an upper rail, a lower rail, a hinge-side rail, and a latch-side rail, wherein a groove may be disposed within at least the upper and lower rails, and the frame may be disposed within the inner door. A fixed panel portion may be provided within the frame, extending at least from the lower rail to the upper rail, and extending at least from a first edge adjacent the hinge-side rail to a second edge toward, but located short of the latch-side rail. A movable panel portion may also be provided, configured such that a lower portion of the movable panel is located within the lower rail groove, and an upper portion of the movable panel is located within the upper rail groove (e.g., so as to slide therein).

The movable panel portion can therefore travel within the upper and lower rail grooves from a closed portion, in which the movable panel portion extends from at least the second edge of the fixed panel portion, to the latch-side rail (i.e., closing off the access opening), to an open position in which the user may access the latching mechanism of the outer door, as the movable panel portion is slid backwards (towards the hinge-side rail). A biasing member may be provided, with a first end and second end, where the first end may be coupled to a fixed portion of the inner door (e.g., to the fixed panel portion), and the second end may be coupled to the movable panel portion. The biasing member may be configured such that the movable panel portion remains in the closed position until, and only while sufficient force is applied to move the movable panel portion towards the open position.

Another embodiment is directed to an inner door with a self-closing access panel where the inner door includes a rectangular frame disposed within the inner door, including an upper and lower groove within the frame. A fixed panel portion extends from at least the lower portion of the frame to the upper portion of the frame and from a first side of the frame to a point that is short of the second, opposite side of the frame. The movable panel portion includes an upper portion disposed within the upper groove and a lower portion disposed within the lower groove. When the movable panel is in the closed position, it extends from the second edge (i.e., towards or at least near where the door opens) to at least a point that overlaps with a portion of the fixed panel. A biasing member is operatively coupled between the movable panel portion and the fixed panel portion, so as to provide sufficient biasing force to the movable panel to return it to the closed position whenever sufficient opening force is not applied. It will be apparent that some overlap between the movable panel portion and the fixed panel portion may thus always be provided, whether open or closed, although when the movable panel portion is opened, the amount of overlap is increased.

Another embodiment is directed to a method of use. For example, a method for opening only a portion of an inner door of a two-door system of an RV, to allow a user to pass an object through the opened portion of the inner door to an exterior of the RV. It will be appreciated that thus the exterior door may be open, and the inner door may be closed, but that the self-closing movable access panel portion of the inner door may be open. Such a method may include providing an inner door with a self-closing access panel of a two-door system in an RV as described herein, and from the interior cabin of the RV, applying an opening force to the movable access panel portion to temporarily open the opening in the inner door. The person may then hand an object through the opening in the inner door to another person outside of the RV. Once the object (e.g., a beverage) has been handed off, the user may allow the movable access panel portion to close over the opening in the inner door (e.g., by simply withdrawing their hand). Such method steps could similarly be employed to hand objects through the opening in the other direction. In some embodiments, a handle or other grip could be provided on the exterior side of the self-closing movable panel portion of the inner door, to allow its operation from the exterior of the RV, so long as the exterior door is open.

BRIEF DESCRIPTION OF THE DRAWINGS

To further clarify the above and other advantages and features of the present invention, a more particular description of the invention will be rendered by reference to specific embodiments thereof which are illustrated in the appended photographs. It is appreciated that these photographs depict only illustrated embodiments of the invention and are therefore not to be considered limiting of its scope. The invention will be described and explained with additional specificity and detail through the use of the accompanying photographs in which.

DETAILED DESCRIPTION OF THE PREFERRED EMBODIMENTS

Figure 1:
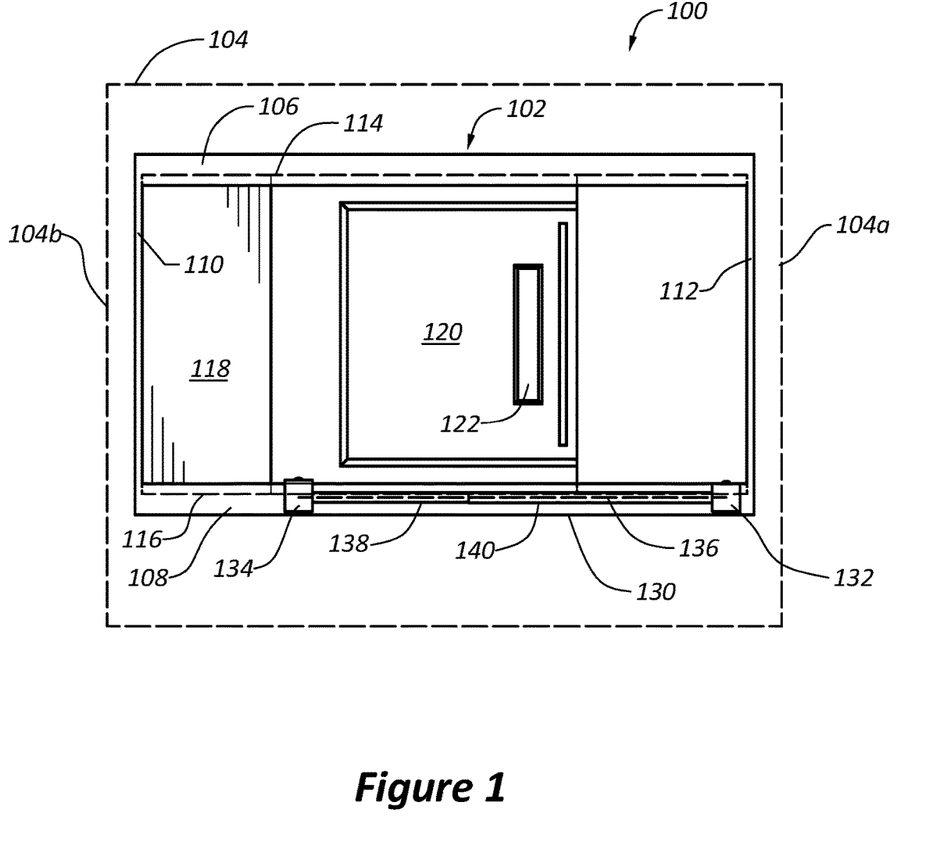
FIG. 1 illustrates an exemplary embodiment of an interior door access panel assembly in relation to an exterior door and which includes a pulling force biasing member.

An embodiment of a self-closing interior access door 100 (also referred to herein as an inner door) is illustrated in FIG. 1. In embodiment 100, an access panel assembly 102 is located within the interior of an interior door 104. Interior door 104 may be oriented such that it swings out from hinge edge 104b and latches on the side corresponding to edge 104a. Access panel assembly 102 may include an upper rail 106, a lower rail 108, a hinge-side rail 110, and a latch-side rail 112. Disposed within upper and lower rails 106 and 108, are upper and lower grooves illustrated as dashed lines 114 and 116, respectively.

Together, the upper, lower, hinge-side, and latch-side rails combine to form a frame corresponding to the plane of interior door 104. The frame may be formed from a single piece of material such as plastic, metal, polymer, alloy, or other material suitable for an interior door. It may comprise multiple components assembled using appropriate fasteners, adhesives, or other joining techniques, or it may be formed as a single component from any suitable material including but not limited to those materials indicated above.

Disposed within the frame assembly are fixed panel portion 118 and movable panel portion 120. Movable panel portion 120 may include a handle portion 122. In embodiment 100, panel portions 118 and 120 may be made of a transparent or translucent material such as plastic, Plexiglas, Lucite, tempered safety glass, or the like. In another embodiment, panel portions 118 and 120 may be made of an open screen material such as wire screen or a polymer or plastic screen. In some configurations a combination of any of the above or other materials may be used. For example, in some embodiments, fixed panel portion 118 is made of a screen material while movable panel portion 120 is made of a transparent or translucent plastic material. It need only be recognized that in embodiment 100, one panel remains substantially static or stationary in relation to assembly 102 while the other panel portion is movable (e.g., slidable) in relation to the remainder of assembly 102.

Fixed panel portion 118 may extend from upper rail 106 to lower rail 108. Additionally, in embodiment 100, fixed panel portion 118 is illustrated as located within assembly 102, adjacent to hinge-side rail 110, and extending toward, but not all the way to, latch-side rail 112. Fixed panel portion 118 extends far enough toward hinge-side rail 110 that it may overlap or at least reach the same distance towards rail 112 as movable panel portion 120, but not far enough that it obstructs access to whatever clearance space is necessary to operate the door latch component of the exterior door (not shown, but typically hidden behind movable panel portion 120 when the exterior door is closed). In other words, the exact hinge-side to latch-side dimensions of fixed panel portion 118 may vary, but are configured in conjunction with the size of movable panel portion 120 and the location and access requirements for the exterior door latch.

In some embodiments, fixed panel portion 118 is attached to the upper, lower, and hinge-side rails 106, 108, 110 with an adhesive. In some embodiments, the connection is made with a physical connector like a fastener or bracket, while in other embodiments, fixed panel portion 118 may be formed integrally with one or more of the other frame members as a single body and perhaps out of a single material. In some embodiments, edge portions of fixed panel portion 118 are disposed within upper and lower grooves 114 and 116 while in other embodiments fixed panel portion 118 may be mounted to the interior surfaces of the upper and lower rails 106, 108. In still other embodiments, fixed panel portion 118 may be mounted to the exterior surface of one or more of the upper, lower, or hinge-side rails 106, 108, 110.

Conversely, moveable panel portion 120 is "free floating" within assembly 102 in that it is not typically statically attached at any point to any frame member. Rather, panel portion 120 is slidable within upper groove 114 and lower groove 116 which are disposed or formed within upper rail 106 and lower rail 108, respectively. Thus, because portions of movable panel portion 120 are restricted and contained within the upper and lower grooves 114, 116, the panel portion 120 is movable horizontally, in the vertical plane defined by the inner door, but substantially restricted against other movements, e.g., vertically (as a result of seating within grooves 114, 116). Similarly, panel portion 120 is restricted against movement in a plane that would be perpendicular to assembly 102 (i.e., in and out of the page on which FIG. 1 is shown).

Moveable panel portion 120 also includes a handle portion 122 that can be employed by a user to slide the panel in a horizontal direction toward the hinge-side of assembly 102. In most configurations, handle portion 122 may be formed integrally, as a single piece of material with the main body of panel portion 120 but may also be a separate component attached to panel portion 120 by any suitable means.

Thus far, the description described, generally, the structure and function of screen-door access panels provided in two door configurations where a user desires to access a latching mechanism in an exterior door through an access panel in an interior door. In such systems, the user would slide a panel (e.g., movable panel portion 120) away from a position that obstructs a latch mechanism in the exterior door, reach through the access panel to engage the latch mechanism, and then open at least the exterior door. Where both the interior and exterior doors are opened, the user may then exit the vehicle. At this point, a user may desire to leave the exterior door open while closing the interior door. This may be desirable where the interior door is configured as a screen door to allow better airflow to the interior of the vehicle, to allow items (e.g., beverages and the like) to be passed through the access panel opening in the interior door, etc. In some configurations, the interior door may be configured to limit rain, wind, or other elements from entering the vehicle, and may instead incorporate transparent or translucent material that allows greater amounts of light to enter the vehicle than is possible with the exterior door closed. Of course, all or at least a portion of the inner door could be opaque (e.g., an opaque inner door with a transparent or translucent window).

Prior to the embodiments described herein, once a user exited the vehicle and closed the interior door, the access panel remained in the open position (or would only be closed if the user specifically closed it). Users often forgot or failed to close the movable panel portion over the access panel in the interior door, allowing an avenue for unwanted pests or other undesirable external elements to enter the vehicle.

Thus, in embodiment 100, a biasing member assembly 130 is advantageously included to provide means for automatically closing movable panel portion 120 once a user has accessed and opened the exterior door latch.

In embodiment 100, biasing member sub-assembly 130 is illustrated as including fixed attachment block 132, movable attachment block 134, biasing member 136 (e.g., an elongate elastomeric member, such as a bungee), inner guide sleeve 138, and outer guide sleeve 140.

In embodiment 100, fixed attachment block 132 is statically fixed to some portion of assembly 102. In some embodiments, fixed block 132 may be physically attached to assembly 102 using adhesive, a mechanical fastener, or some other suitable method. In other embodiments, fixed block 132 may be integrally formed with another portion of assembly 102. In any embodiment, fixed block 132 is configured to remain substantially static relative to movable attachment block 134, while a user slides movable panel portion 120 to the open position (or allows it to retract back to the default closed position).

Movable attachment block 134, conversely, is attached to movable panel portion 120. The attachment may be made by any suitable means including an adhesive or mechanical fastener or by some other attachment method such as welding or the like. In some embodiments, movable block 134 may also be integrally formed with some portion of movable panel portion 120. Movable attachment block 134 moves with movable panel portion 120 depending on the particular configuration of biasing member 136 extending between block 134 and fixed block 132.

While termed "blocks", it will be appreciated that no particular geometry is required in the broadest sense, and that such a block may be any shaped bracket, as desired. For example, brackets that receive sleeves 138, 140, and which may in turn be secured (e.g., screwed or otherwise fastened) to the frame or other portion of the interior door may be used. In some embodiments, a flat surfaced block may be desired, as it provides an excellent surface area to glue or otherwise attach the block to the frame or other portion of the interior door.

Extending between fixed block 132 and movable block 134 are inner and outer guide sleeves 138 and 140. In embodiment 100, outer sleeve 140 is a substantially hollow cylindrical tube configured to allow inner sleeve 138 to travel at least partially within the cylinder. Additionally, in illustrated embodiment 100, inner sleeve 138 is also hollow. This allows biasing member 136 (shown as a dotted line) to extend from fixed attachment block 132, through outer guide sleeve 140 and inner guide sleeve 138, and attach at the other end to movable attachment block 134.

Inner and outer guide sleeves 138 and 140 are depicted as being substantially cylindrical in embodiment 100. However, in other embodiments, analogous components may be square, rectangular, or any other shape so long as the inner guide sleeve is capable of sliding within the outer guide sleeve (e.g., telescoping one within the other) and a biasing member is capable of translating a biasing force from a first attachment point, along both guide sleeves, to a second point. Depending on the embodiment, differing guide sleeve shapes (and or block shapes) may provide certain benefits including increased surface area for attachment, increased durability, reduction in binding, increased protection, aesthetic improvements, or other benefits.

Similarly, the guide sleeves may be formed from any suitable material like plastics, metals, metal-alloys, or other similar materials. The materials and shapes of the inner and outer guide sleeves need not be identical to each other. For instance, in some embodiments, a hydraulic biasing force may be implemented wherein the outer guide sleeve is filled with a compressible fluid. In such a configuration, the inner guide sleeve would essentially be configured as a piston and may include a seal such as an o-ring or gasket. In such configurations, the inner sleeve may be a solid rod (rather than hollow) to, e.g., increase rigidity. However, even in such a configuration, a biasing member is still configured to translate a biasing force from a fixed attachment block (e.g., 132), along the guide sleeves, and into the movable attachment block (e.g., 134) which in turn returns the movable panel to the biased closed position.

In some embodiments, fixed attachment block 132 and movable attachment block 134 may be omitted. This is possible in configurations where inner and outer guide sleeves 138 and 140 include integrated attachment points. For example, in configurations where the guide sleeves are substantially square, rectangular or other shape including a flat attachment surface in cross-sectional profile, one distal end of one guide sleeve (e.g., facing the exterior door) may serve as the fixed attachment point, while the opposing end of the other guide sleeve (also facing the exterior door) serves as the movable attachment point. For example, one may simply glue, weld, or otherwise affix at least one end of one of the guide sleeves to a stationary, fixed portion of the access panel assembly or door, and affix another end of the other guide sleeve to the movable panel portion of the access panel assembly. Such a configuration is particularly desirable when the biasing member assembly may be located internal to assembly 102.

Returning to embodiment 100, as movable panel 120 is moved by a user from the closed position toward the open position, movable block 134 and fixed block 132 may be forced farther apart. Stated another way, block 132 may remain stationary while movable block 134 may move backwards, towards hinged edge 104b. In turn, biasing member 136 moves from a lower energy state to a higher energy state. In this context, "energy state" is used to describe the concept that the biasing member is configured to return to the lower energy state whenever there is not adequate opposing force provided by the user to keep it in the higher energy state. Hence, in the open position, the biasing member 136 is said to be in a higher energy state relative to the lower energy state of the closed position. In embodiment 100, when the user ceases providing an opening force on movable panel 120, the biasing member 136 exerts a pulling closing force on movable attachment block 134 which in turn translates that force to movable panel 120 causing it to close.

Biasing member 136 may comprise an elastic member (e.g., a bungee). Such an elastic member may simply extend between attachment points associated with the ends of the sleeves 138, 140. For example, in an embodiment, biasing member 136 may be an elastomeric member (e.g., a bungee) that stretches between an attachment pin or other attachment point on stationary block 134, and an attachment pin or other attachment point on movable attachment block 134. The biasing member 136 may simply be looped around each attachment pin. Such an elastomeric biasing member may be preferred over coil springs or hydraulic biasing members because of advantages of increased durability (over a spring) and decreased complexity (over hydraulic configurations). Such an elongate elastic member is also relatively easy to replace, should such ever be necessary (e.g., easier than replacing a coiled spring).

Figure 2:
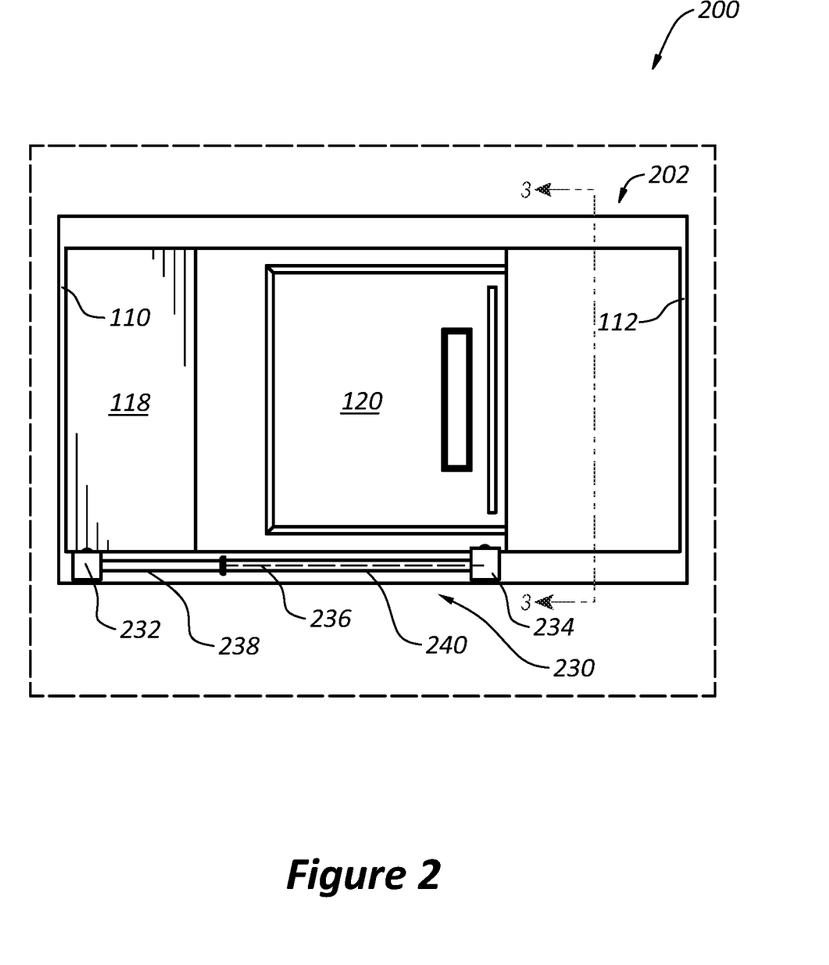
FIG. 2 illustrates an embodiment of an interior door access panel assembly including a pushing force biasing member.

Turning now to FIG. 2, embodiment 200 is similar to embodiment 100 except that now, biasing member assembly 230 has been reversed relative to biasing member assembly 130 of FIG. 1. In this configuration, as movable panel 120 is moved by a user from the closed position to the open position (i.e., towards the hinge-edge at left), movable block 234 and fixed block 232 are forced closer together, e.g., causing outer guide sleeve 240 to slide (e.g., telescope) over inner guide sleeve 238. Thus, in this embodiment, when the user ceases providing an opening force on movable panel 120, the biasing member 236 exerts a pushing closing force on movable attachment block 234 which in turn translates that force to movable panel 120 causing it to close. It will be apparent from comparing FIG. 1 to FIG. 2, that embodiment 100 shown in FIG. 1, stationary or fixed block 132 may be disposed at a location closer to rail 112 than movable block 134. In FIG. 2 and embodiment 200, the locations of the fixed and movable blocks have been reversed, so that movable block 234 is "forward" relative to fixed block 232, which is now "behind" block 234, where the closing motion of movable panel portion 120 defines what is "forward". Furthermore, while the illustrated embodiments are illustrated as hinged at left, it will be appreciated that the hinge-edge could alternatively be at the right.

In other embodiments, the biasing member assembly may be configured to operate in an orientation other than parallel to the horizontal plane shown. For instance, the biasing member may be oriented vertically with a means of translating the biasing force from the vertical axis to the horizontal axis, or the movable panel portion could slide vertically up and down, rather than horizontally left to right. Any orientation between horizontal and vertical could also be provided, as desired.

According to one embodiment, the movable panel portion could be configured to slide up and down, substantially vertically. In such an embodiment, no biasing member may actually be needed, where the fixed panel portion is disposed vertically above the movable panel portion, and the movable panel portion for selectively covering the access panel is therebelow. Instead of a biasing member, the movable panel portion may simply rely on the influence of gravity to pull the movable panel portion downward, covering the access panel opening. Such a configuration similarly defaults to a closed position of the movable panel portion over the access panel opening through the interior door, but relies on the principle of gravity rather than an active biasing member to achieve such a result. FIGS. 5-8 illustrate an example of such an embodiment, which will be described in further detail below.

Additionally, in some embodiments, attachment blocks 232 and 234 (or 132 and 134 in FIG. 1) may be omitted altogether as described above. In another embodiment, a biasing member may be integrated within either the upper rail (e.g., 206) or lower rail (e.g., 208) by attaching the biasing member to a static position within the respective rail and attaching the other end to a portion of the movable panel portion 120. As with FIGS. 1 and 2, even when the attachment blocks are omitted, the biasing member can function to either provide a pushing closing force or a pulling closing force, as desired.

Figure 3:
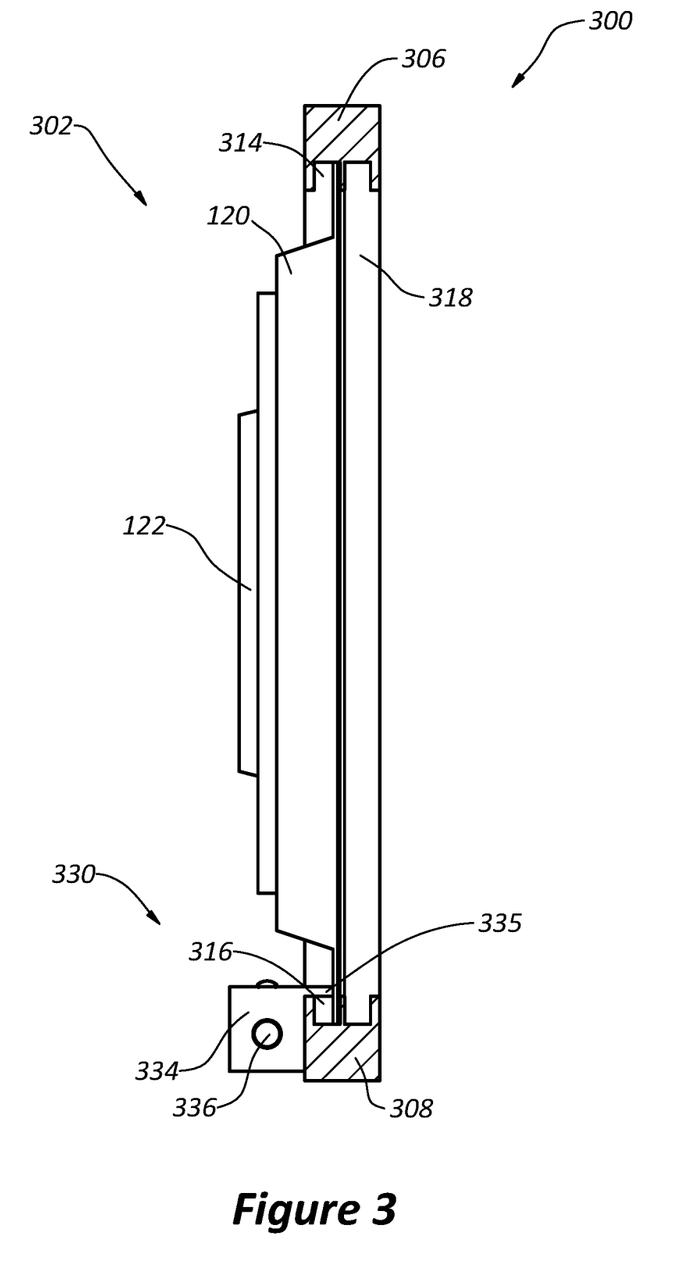
FIG. 3 illustrates a longitudinal cross section of an exemplary embodiment of an interior door access panel assembly.

Turning to FIG. 3, a cross section is shown of an exemplary assembly 302. In this embodiment, the arrangement of biasing assembly 330 is similar to the arrangement in embodiment 200 of FIG. 2 with the movable attachment block 334 being attached forward of the fixed attachment block (not shown in FIG. 3, as it is behind movable attachment block 334). Additionally, in this cross-section, moveable attachment block 334 is illustrated with an extension portion 335 extending from the main block body to make contact with movable panel 120. Additionally, embodiment 300 illustrates one configuration of grooves 314 and 316 allowing movable panel portion 120 to ride within.

It will be appreciated that in some embodiments, the biasing member assembly or assemblies may be disposed within groove 314 and/or 316, largely or entirely hiding them from sight. In other words, the components of the biasing member assembly may be relocated from exterior of the assembly (e.g., 302) to within the assembly. In such an embodiment, the biasing member assembly includes a biasing member (e.g. 136), inner guide sleeve (e.g., 138), and outer guide sleeve (e.g. 140). The guide sleeves may then be configured such that inner sleeve is at least partially disposed within the outer sleeve and is able to travel within the outer sleeve corresponding to the opening and closing of movable panel portion 120.

Further, in such embodiments where the biasing assembly is internal to the frame, the first end of the inner guide sleeve may be located immediately adjacent to the hinge-side edge of movable panel 120 while the second end of the inner sleeve may be partially disposed within the first end of the outer guide sleeve. The second end of the outer guide sleeve may then be located immediately adjacent to the hinge-side rail of the assembly (e.g., 302). In such an embodiment, it may or may not be desirable to physically attach the ends of the biasing member sleeves to their adjacent structural member (e.g., the hinge-side rail or the movable panel.) However, because the biasing member may provide a pushing closing force in this configuration, the assembly may be configured such that the biasing force alone is enough to keep the respective components engaged and in the proper position without physical attachment.

In some configurations, the guide sleeves may both be attached to their adjacent member or only one or the other may be attached. Additionally, it should be noted that it does not matter which sleeve is adjacent to the hinge-side rail and which is adjacent to the movable panel as all that is necessary is for one end to remain stationary while the other guide sleeve moves in and out (or over) the other guide sleeve in conjunction with the opening and closing of movable panel portion 120.

Returning to FIG. 3, biasing member 336 may be configured to provide a pushing closing force on movable panel 120. Thus, as movable panel portion 120 is moved by a user from the biased (closed) position into an open position, the inner guide sleeve becomes further disposed within outer guide sleeve, by either sleeve moving in conjunction with the movable panel 120. In this embodiment, biasing member 336 is configured to provide a resisting force to an opening movement. That may be accomplished by use of a coil spring, pneumatic piston, hydraulic piston, or other suitable resisting element (or combination of components) that can be configured to reside within the guide sleeve assembly.

As discussed previously, the guide sleeve and biasing member assembly may be installed directly within lower groove 316 and/or upper groove 314 to provide the requisite lateral support to ensure that the two sleeves properly nest within each other along the biasing axis. In other configurations, the guide sleeve and biasing member assembly may be integrated within a portion of the upper or lower frame rails 306, 308 other than upper and lower grooves 316 and 314 (e.g., above upper groove 314 if installed in upper rail 308, or below lower groove 316 if installed in lower rail 308). In such configurations, an attachment extension may extend into the respective groove in order to provide a contact surface for movable panel portion 120 to interface with the biasing member assembly 330.

In some configurations (e.g., as shown in FIG. 3) the upper groove 314, lower groove 316, and fixed panel portion 118 may create a complementary "T" groove and cross-sectional profile. As with other embodiments discussed herein, movable panel portion 120 is able to freely slide within upper and lower grooves 314 and 316 subject to the biasing force of whatever configuration of biasing member is selected. However, in such embodiments, "T" style grooves and panel profiles may create some desirable benefits in some applications.

For example, in some embodiments, fixed panel portion 118 is statically fixed or formed out of upper rail 306, lower rail 308, and/or a hinge-side rail. Because of this, fixed panel portion 118 is relatively secure. However, movable panel portion 120 may not be directly attached to any frame of components (the upper rail, lower rail, hinge side rail, and latch-side rail) as it is necessary for it to slide freely horizontally, in the vertical plane of the inner door. This may present an issue where unwanted access could more easily be gained through simply lifting movable panel portion 120 out of the guide grooves (e.g., 314 and 316 of FIG. 3). Alternatively, depending on manufacturing tolerances, a movable panel portion without a mated groove profile may more easily become dislodged or bind as it is moved. In some embodiments, therefore, it may be desirable to include a mated profile between the upper and lower edges of the movable panel portion and the respective groove(s) in which it travels. While a "T" channel has been discussed and illustrated, any suitable cross-sectional profile may be selected that minimizes risk that the movable panel portion might exit the guide grooves.

Figure 4:
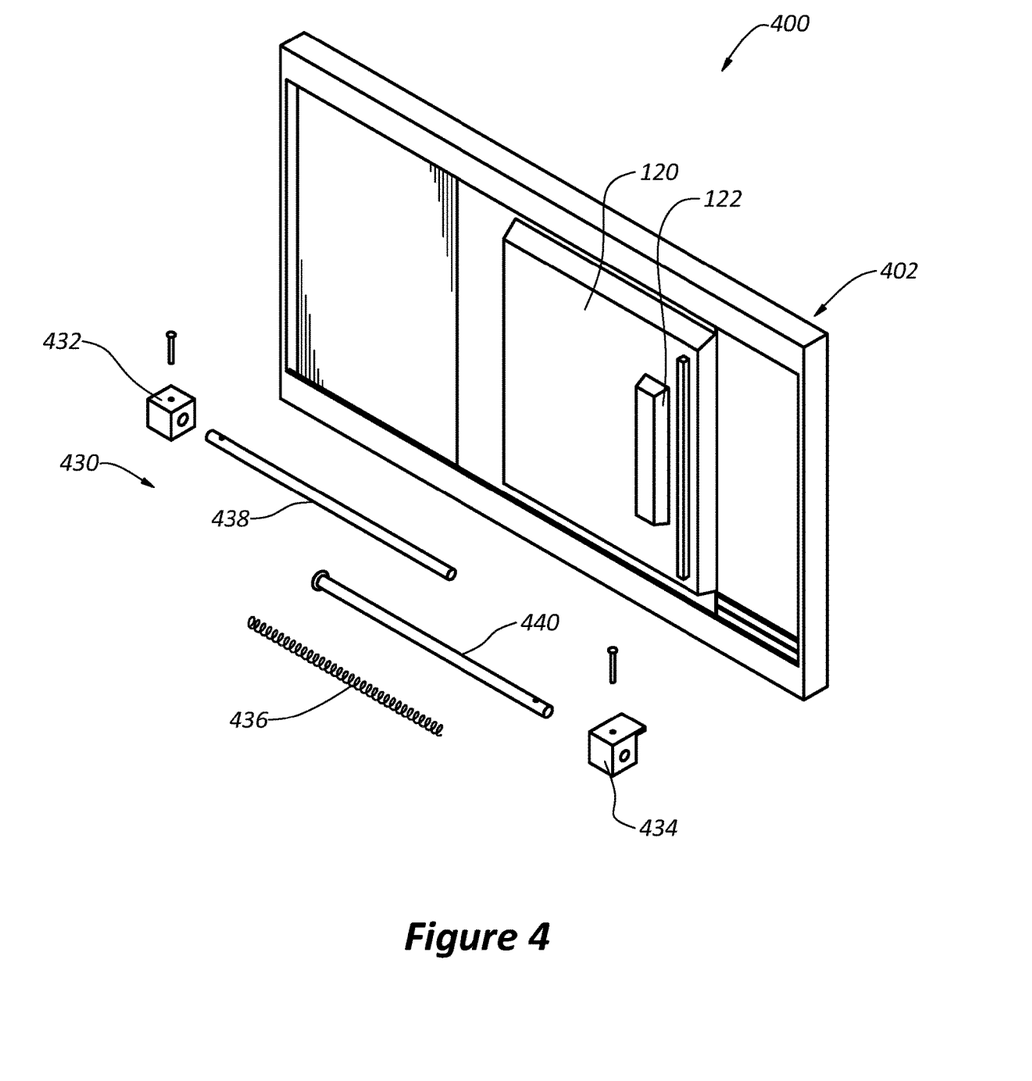
FIG. 4 illustrates an embodiment of an interior door access panel assembly and an exploded view of an embodiment of a biasing member sub-assembly which may be used to bias a panel that selectively covers the access panel to a closed position.

In FIG. 4, embodiment 400 is shown with panel assembly 402 and an exploded view of biasing member sub-assembly 430. In this embodiment, sub-assembly 430 includes static attachment block 432, movable attachment block 434, biasing member 436, inner guide sleeve 438 and outer guide sleeve 440. In this configuration, as movable attachment block 434 (attached to movable panel portion 120) is moved closer to static attachment block 432 (attached to fixed panel portion 118), biasing member 436 provides a pushing biasing force on movable attachment block 434 toward the latch-side of assembly 402.

Embodiment 400 illustrates a biasing member 436 in the form of a coil spring. Such a spring may be made of metal, plastic, or any other material capable of returning to its initial length after being compressed to a shortened length. Further, while a spring is shown, as has been discussed previously, any material or configuration is possible for member 436 so long as a biasing force is provided in the closed direction sufficient to return the movable panel to a closed position once an adequate opening force is removed.

Thus, in some configurations of biasing sub-assembly 430, biasing member 436 may take any of various forms. For instance, a compressible (e.g., elastomeric) polymer may be used. In other configurations member 436 may be a compressible fluid. Where a fluid is used, inner sleeve 438 may include a seal such that the fluid is contained within outer cylinder 440. As movable block 434 moves toward static block 432, inner guide sleeve 438 would become further and further disposed within outer guide sleeve 440. In turn, the compressible fluid within outer sleeve 440 would become more compressed and exert a biasing force in the direction opposite the opening force. Once the opening force is removed, the compressible fluid would return movable block 434 (and in turn, the sliding panel) back to the default, biased position (closed). In yet other configurations, the biasing member may even be a sealed chamber including only air. In such configurations, the compression of air within outer sleeve 440 would provide the biasing force to return the slidable panel to the default, closed position upon removal of the opening force.

While the biasing sub-assembly 430 is shown with a pushing force biasing member, as discussed previously, some embodiments may provide pulling force biasing.

In another embodiment, the biasing member may include a retractable spooling mechanism, such as that sometimes seen with a retractable key ring. The retractable cord member (which is retracted and spooled over such a mechanism) may be attached to the movable attachment block, which in turn may be attached to the movable panel portion of the interior door. The spooling mechanism may itself be fixed to the fixed panel portion, the frame, or other portion of the interior door, so that upon sliding or otherwise moving the movable panel portion open, the retractable cord member unspools from the spooling mechanism. Because of the biasing force applied by such a spring-loaded or other biased spooling mechanism, upon release of the movable panel portion, the retractable cord member pulls the movable panel portion shut.

Figure 5:
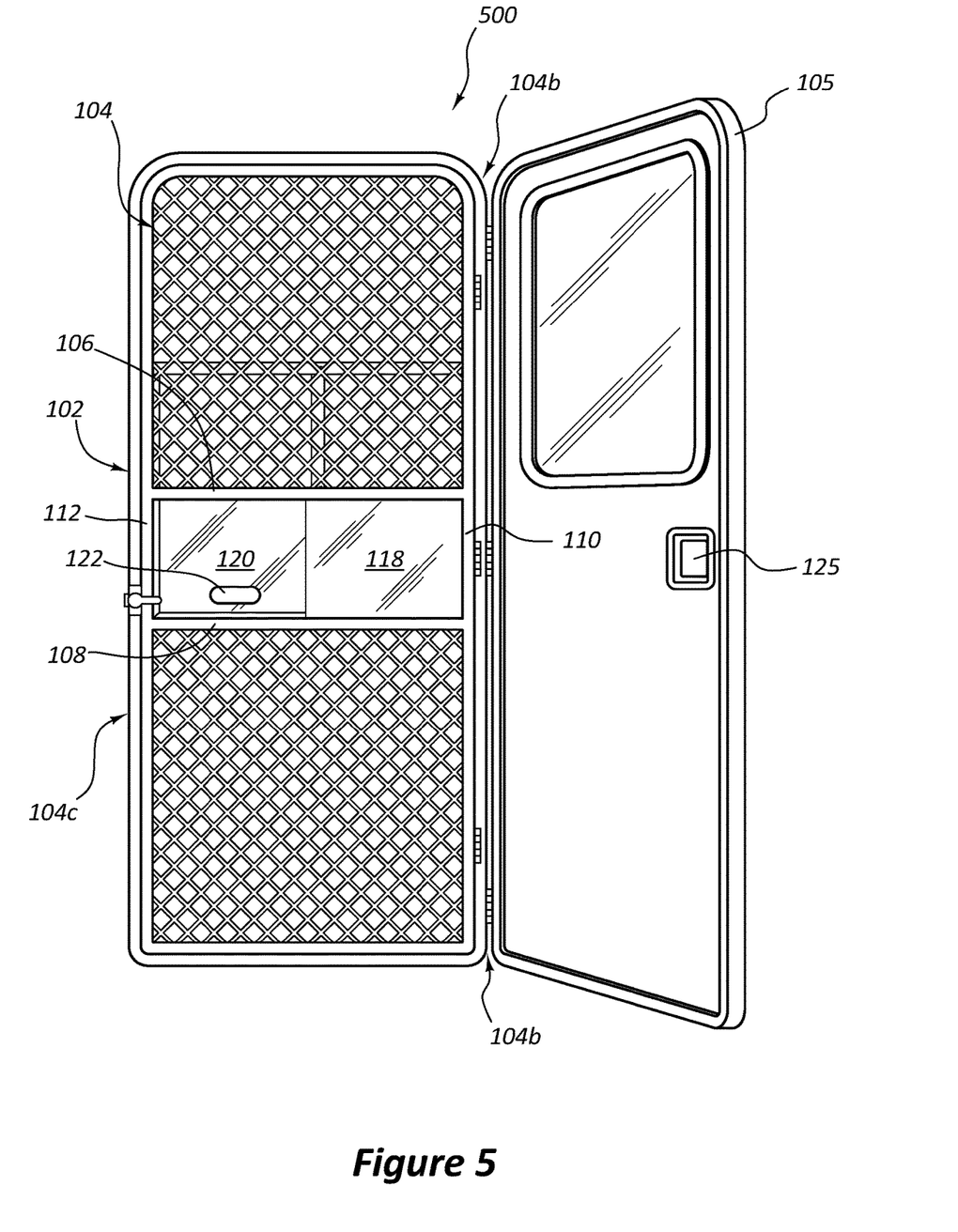
FIG. 5 shows a perspective view of an RV two-door system including an interior door and an exterior door, with an access panel in the interior door which may be configured to slide vertically, rather than horizontally.

Turning to FIGS. 5-8, another embodiment 500 is illustrated. These Figures further illustrate how such an embodiment may simply be a retrofit of an existing RV door including an interior door 104 and an exterior door 105. FIG. 5 shows access panel assembly 102 located within interior door 104. Interior door 104 swings out from hinge edge 104b and latches on the side corresponding to edge 104a. Access panel assembly 102 may include an upper rail 106, a lower rail 108, a hinge-side rail 110, and a latch-side rail 112. As described previously, upper and lower grooves can be provided within rails 106 and 108. FIG. 5 further shows latch 125 of exterior door 105. Latch 125 is accessed through the opening associated with movable panel portion 120, when movable panel portion 120 is opened.

Figure 6A:
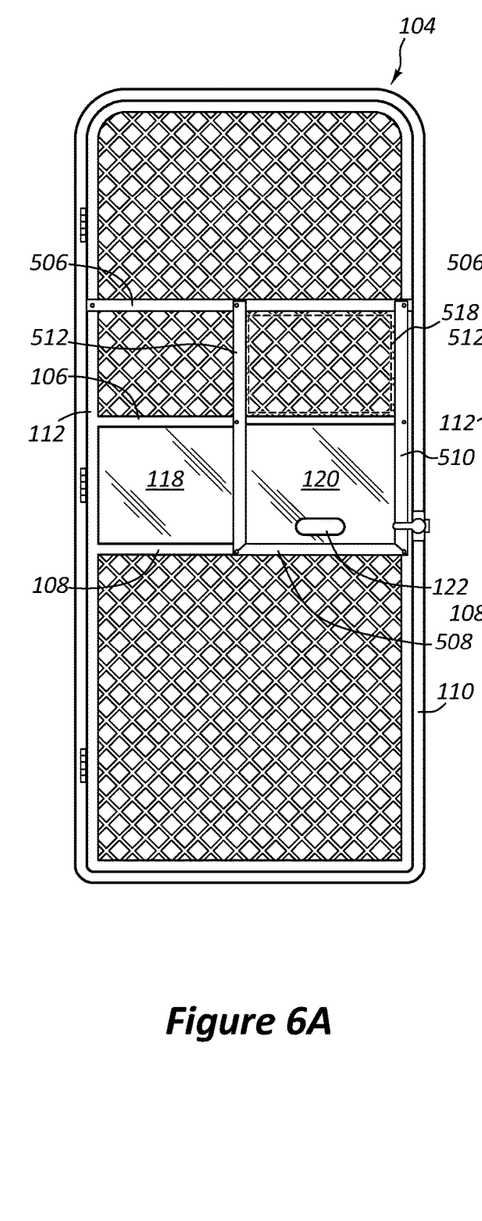
FIG. 6A shows an interior side of the interior door of FIG. 5, with the movable panel portion in a closed, down position.
Figure 6B:
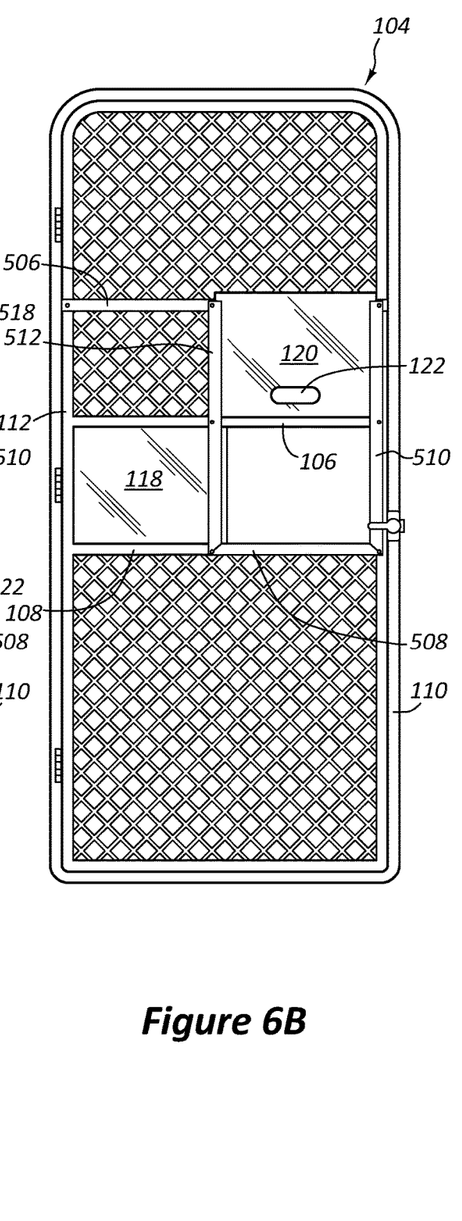
FIG. 6B shows the interior side of the interior door of FIG. 6B, with the movable panel portion in an open, "up" position.

FIGS. 6A-6B show how the interior door 104 may be retrofitted with a vertically sliding movable panel portion 120. For example, first and second vertical rails may be provided, e.g., attached over interior door 104. In the illustrated embodiment, a lower rail or other frame member 508 may be provided at a lower end of the access panel assembly 102, a first side rail 510 (e.g., oriented or located towards hinge side 110), a second side rail 512 at an opposite side of movable panel portion 120 (e.g., located towards latch side 112), and a top rail 506. Where access panel assembly 102 is a retrofit, rails or other frame members 506, 508, 510, and 512 may be attached to rails or frame members of interior door 104 that are already present (e.g., 106, 108, 110, 112). FIG. 6A shows movable panel portion 120 in a closed position, while FIG. 6B shows the retrofitted movable access panel slid vertically, to an open position.

It will be apparent from FIGS. 6A and 6B that in a vertical sliding embodiment such as that shown, the movable panel portion 120 may not necessarily slide over the original fixed panel portion 118, although another fixed panel portion 518 can be identified, e.g., above the movable panel portion, which the movable panel portion slides over. Fixed panel portion 518 may simply be a fixed portion of interior door 104 that remains stationary while moved panel portion 120 is slid, e.g., vertically. Similar to the fixed panel portions described above, fixed panel portion 518 may be defined between rails 506, 106 (top and bottom) and rails 510 and 512 (side to side).

Figure 7A:
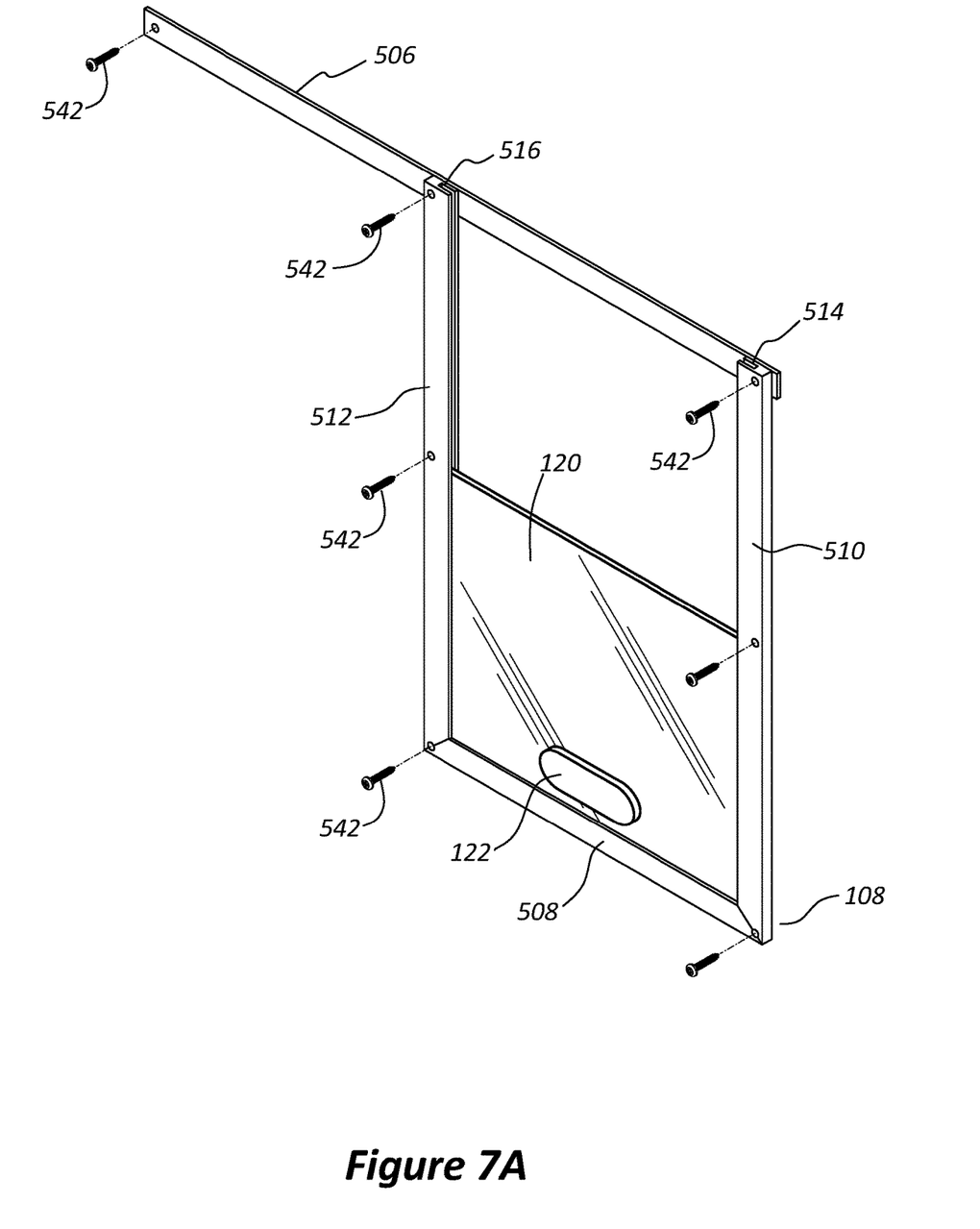
FIG. 7A shows components that may be used to retrofit a horizontal sliding access panel of an existing interior door of a two-door system to one in which the movable panel portion slides vertically, defaulting to a closed position under influence of gravity.
Figure 7B:
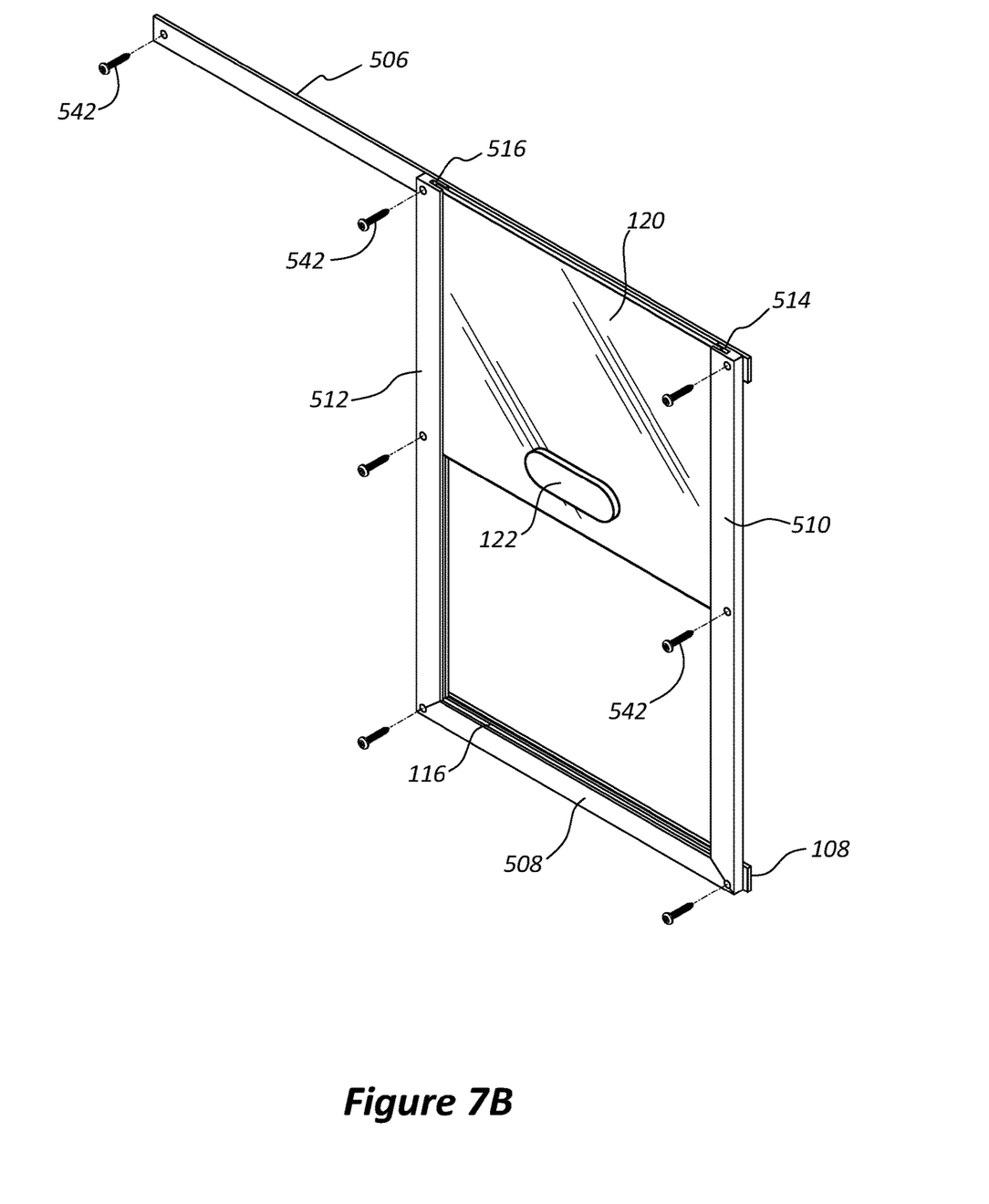
FIG. 7B is similar to FIG. 7A, but shows the movable panel portion in the open position.

FIGS. 7A and 7B illustrate an exemplary retrofit and how such a retrofit may be easily accomplished, e.g., rails or other frame members 510 and 512 may be secured (e.g., with screws 542) to existing frame members or other portions of interior door 104. For example, FIGS. 6A-6B show rail 510 attached to rail 110, and rail 512 attached to rail 108, to rail 106, and to rail 506. Rail 508 is shown attached over rail 108. Other attachment mechanisms and configurations are of course possible. While screws 542 are shown, it will be appreciated that other attachment mechanisms are of course possible, e.g., bolted, use of an adhesive, tape, etc.). In FIGS. 7A-7B, grooves 514 and 516 are shown in side rails 510 and 512, rather than in the top and bottom rails, to accommodate the vertical sliding configuration of the embodiment 500 seen in FIGS. 5-8.

While FIGS. 5-8 principally illustrate how a vertical sliding embodiment may be retrofitted over an existing interior door of a double door system (e.g., an RV double door), it will be appreciated that an interior door of a double door system could be provided with such a vertically sliding mechanism at the time of original manufacture. For example, including vertically oriented movable and fixed panel portions, oriented one above the other, vertically, as will readily be appreciated by one of skill in the art. It will further be apparent that no biasing mechanism may be required in such vertical sliding embodiments, as the movable panel portion 120 will simply slide downward so as to cover the opening for accessing latch 125 under influence of gravity, absent a user's hand or other force being present to hold the movable panel portion open, in the "up" position.

While described as sliding vertically, it will be apparent that some deviation from exactly vertical could be accommodated, such that somewhat diagonal orientations are also within the scope of the disclosure, claims, and meaning of the term "vertical" as employed herein. Deviations from exactly horizontal may also similarly be encompassed herein. While no biasing member may be required in vertical sliding mechanisms, this does not mean that embodiments including any of the biasing members and mechanisms described herein could not be employed to further ensure closing of the vertical sliding movable panel portion. Such embodiments are of course within the scope of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An inner door with a self-closing access panel, the inner door comprising:
   a hinge edge and an access panel assembly, the hinge edge being such that the inner door is capable of moving independently but in a substantially similar path to an outer door, wherein the inner door is located interior to a vehicle relative to the outer door, and wherein the access panel assembly selectively provides access for a user to access and open a latching mechanism of the outer door through a movable panel portion of the inner door without opening the entire inner door, the access panel assembly comprising:
      a frame including an upper rail, a lower rail, a hinge-side rail, and a latch-side rail, wherein a groove is disposed within at least the upper and lower rails, and the frame is disposed within the inner door;
      a fixed panel portion within the frame extending at least from the lower rail to the upper rail and extending at least from a first edge adjacent the hinge-side rail to a second edge toward but short of the latch-side rail;
      a movable panel portion configured such that a lower portion of the moveable panel is located within the lower rail groove, and an upper portion of the movable panel is located within the upper rail groove, wherein the movable panel can travel within the upper and lower rail grooves from a closed position, in which the movable panel extends from at least the second edge of the fixed panel portion to the latch-side rail, to an open position in which the user may access the latching mechanism of the outer door; and
      a biasing member with a first end and a second end, the first end being coupled to a fixed portion of the inner door and the second end being coupled to the movable panel portion, the biasing member configured such that the movable panel remains in the closed position until, and then only while, sufficient force is applied to move the movable panel toward the open position;
      a first attachment block attached to the moveable panel portion of the inner door, and a second attachment block attached to the fixed portion of the inner door;
      an outer guide sleeve and an inner guide sleeve, wherein the inner guide sleeve is configured to travel at least partially within the outer guide sleeve along an axis that is parallel to an axis along which the movable panel portion travels; and
      wherein the biasing member comprises an elastic member attached at a first end to the first attachment block and at a second end to the second attachment block and disposed within the inner and outer guide sleeves, wherein the attachment blocks are a first distance apart while in the closed position and the elastic member is configured to provide a force to return the attachment blocks to the closed position when the distance between the attachment blocks differs from the first distance.

2. The inner door of claim 1, wherein the elastic member extends between the first end and the second end such that as the movable panel portion is opened, the elastic member stretches.

3. The inner door of claim 1, wherein the movable panel portion is slidable within the upper rail groove and the lower rail groove.

4. The inner door of claim 1, wherein at least one of the upper groove or the lower groove of the frame includes a "T" shaped cross-sectional profile and the corresponding portion of the moveable panel includes a corresponding mated cross-sectional profile to mate within the "T" shaped cross-sectional profile of the upper or lower groove.

5. The inner door of claim 1, wherein the biasing member further comprises a compressible member coupled between the first end and the second end such that when an opening force is applied to the movable panel portion, the compressible member is compressed, and when the opening force is removed, the compressible member expands, closing the movable panel portion.

6. The inner door of claim 1, wherein the outer guide sleeve and the inner guide sleeve are both cylindrical.

7. The inner door of claim 1, wherein the first and second attachment blocks are configured such that as the movable panel portion moves toward the open position, the distance between the attachment blocks is increased relative to the first distance.

8. The inner door of claim 1, wherein the first and second attachment blocks are configured such that as the movable panel portion moves toward the open position, the distance between the attachment blocks is decreased relative to the first distance.

9. A method for opening only a portion of an inner door of a two-door system of a vehicle, to allow a user to pass an object through the opened portion of the inner door to an exterior of the vehicle, the method comprising:
   providing the inner door with a self-closing access panel of a two-door system in a vehicle, the inner door comprising:
      a hinge edge and an access panel assembly, the hinge edge being such that the inner door is capable of moving independently but in a substantially similar path to an outer door, wherein the inner door is located interior to a vehicle relative to the outer door, and wherein the access panel assembly selectively provides access for a user to access and open a latching mechanism of the outer door through a movable panel portion of the inner door without opening the entire inner door, the access panel assembly comprising:
         a frame including an upper rail, a lower rail, a hinge-side rail, and a latch-side rail, wherein a groove is disposed within at least the upper and lower rails, and the frame is disposed within the inner door;
         a fixed panel portion within the frame extending at least from the lower rail to the upper rail and extending at least from a first edge adjacent the hinge-side rail to a second edge toward but short of the latch-side rail;
         a movable panel portion configured such that a lower portion of the moveable panel is located within the lower rail groove, and an upper portion of the movable panel is located within the upper rail groove, wherein the movable panel can travel within the upper and lower rail grooves from a closed position, in which the movable panel extends from at least the second edge of the fixed panel portion to the latch-side rail, to an open position in which the user may access the latching mechanism of the outer door; and a biasing member with a first end and a second end, the first end being coupled to a fixed portion of the inner door and the second end being coupled to the movable panel portion, the biasing member configured such that the movable panel remains in the closed position until, and then only while, sufficient force is applied to move the movable panel toward the open position;

a first attachment block attached to the moveable panel portion of the inner door, and a second attachment block attached to the fixed portion of the inner door;

an outer guide sleeve and an inner guide sleeve, wherein the inner guide sleeve is configured to travel at least partially within the outer guide sleeve along an axis that is parallel to an axis along which the movable panel portion travels; and wherein the biasing member comprises an elastic member attached at a first end to the first attachment block and at a second end to the second attachment block and disposed within the inner and outer guide sleeves, wherein the attachment blocks are a first distance apart while in the closed position and the elastic member is configured to provide a force to return the attachment blocks to the closed position when the distance between the attachment blocks differs from the first distance; and from the interior cabin of a vehicle, applying an opening force to the movable access panel portion to temporarily open the opening in the inner door;

handing an object through the opening in the inner door to another person outside of the vehicle; and allowing the movable access panel portion to close over the opening in the inner door after handing the object to the other person.

10. The method of claim 9, wherein the object is a beverage.

11. An inner door with a self-closing access panel, the inner door comprising:

a rectangular frame disposed within the inner door including an upper and lower groove;

a fixed panel portion extending from at least the lower portion of the frame to the upper portion of the frame and from a first side of the frame to a point short of a second, opposite, side of the frame;

a movable panel portion with an upper portion disposed within the upper groove and a lower portion disposed within the lower groove, wherein when the movable panel is in a closed position, it extends from the second edge to at least a point that overlaps with a portion of the fixed panel; and a biasing member that provides a sufficient biasing force to the movable panel portion to return the movable panel to the closed position whenever a sufficient opening force is not present;

a first attachment block attached to the moveable panel portion of the inner door, and a second attachment block attached to the fixed portion of the inner door;

an outer guide sleeve and an inner guide sleeve, wherein the inner guide sleeve is configured to travel at least partially within the outer guide sleeve along an axis that is parallel to an axis along which the movable panel portion travels; and wherein the biasing member comprises an elastic member attached at a first end to the first attachment block and at a second end to the second attachment block and disposed within the inner and outer guide sleeves, wherein the attachment blocks are a first distance apart while in the closed position and the elastic member is configured to provide a force to return the attachment blocks to the closed position when the distance between the attachment blocks differs from the first distance.

12. The inner door of claim 11, wherein one of the first attachment block or the second attachment block is a fixed attachment block and the other of the first attachment block or the second attachment block is a movable attachment block.

13. The inner door of claim 12, wherein the biasing member extends between a fixed first end and movable second end and provides a biasing force in a closed direction.

14. The inner door of claim 13, wherein the biasing member is disposed within at least one of the upper groove or the lower groove, wherein the first end is attached to the first frame side and the second end is attached to the movable panel.

15. The inner door of claim 13, wherein the biasing member is located on the exterior of the frame and includes a fixed attachment point at the first end, and a movable attachment point at the second end, the fixed attachment point being located somewhere on the frame and the movable attachment point being located somewhere on the movable panel.

16. The inner door of claim 13, wherein the biasing force causes the first end and the second end to be forced farther apart.

17. The inner door of claim 13, wherein the biasing force causes the first and second ends to be forced nearer together.

18. The inner door of claim 11, wherein the rectangular frame is integrally formed with at least a portion of the inner door.

* * * * *